(12) United States Patent
Missotten et al.

(10) Patent No.: US 9,763,391 B2
(45) Date of Patent: Sep. 19, 2017

(54) COMBINE HARVESTER WITH TOP-LOCATED CLEANING ARRANGEMENT

(71) Applicant: CNH Industrial America LLC, New Holland, PA (US)

(72) Inventors: Bart M. A. Missotten, Winksele (BE); Frank R. G. Duquesne, Zwevegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/491,550

(22) Filed: Sep. 19, 2014

(65) Prior Publication Data

US 2016/0255776 A1 Sep. 8, 2016

(30) Foreign Application Priority Data

Sep. 19, 2013 (BE) .................................. 2013/0626

(51) Int. Cl.
| | | |
|---|---|---|
| A01F 12/52 | (2006.01) | |
| A01F 12/46 | (2006.01) | |
| A01F 12/30 | (2006.01) | |
| A01F 12/32 | (2006.01) | |
| A01F 7/06 | (2006.01) | |
| A01F 12/44 | (2006.01) | |

(52) U.S. Cl.
CPC .............. *A01F 12/46* (2013.01); *A01F 7/062* (2013.01); *A01F 12/30* (2013.01); *A01F 12/32* (2013.01); *A01F 12/444* (2013.01); *A01F 12/446* (2013.01)

(58) Field of Classification Search
CPC ... A01F 12/52; A01F 12/442; A01F 2012/188

USPC ............................................................. 56/13
See application file for complete search history.

(56) References Cited

U.S. PATENT DOCUMENTS

| | | | | |
|---|---|---|---|---|
| 1,887,817 | A | | 11/1932 | Messinger |
| 2,507,669 | A | * | 5/1950 | Heth ...................... A01D 41/04 |
| | | | | 239/661 |
| 3,115,142 | A | * | 12/1963 | Kepkay ................... A01F 12/18 |
| | | | | 460/14 |

(Continued)

FOREIGN PATENT DOCUMENTS

| | | |
|---|---|---|
| DE | 3310449 A1 | 9/1984 |
| DE | 3324492 | 1/1985 |

(Continued)

OTHER PUBLICATIONS

ARBOS Mietitrebbia 565/A4L Manual, Combine Harvester Model, 10 pages, Musso, Italy.
ARBOS Combine Accessory Catalog, 4 pages.

*Primary Examiner* — Árpád Fábián-Kovács
(74) *Attorney, Agent, or Firm* — Patrick M. Sheldrake

(57) ABSTRACT

In a combine harvester the cleaning arrangement is placed above the threshing and separation system so that the sieves of the cleaning arrangement can be wider than the distance between the front wheels or tracks of the harvester. A supply such as one or more auger beds are provided underneath the threshing and separation system, for gathering the grain/residue mixture in a single location. From that location, an elevator transports the grain/residue mixture up towards the cleaning arrangement, where it is distributed over the width of the cleaning arrangement.

16 Claims, 3 Drawing Sheets

(56) References Cited

U.S. PATENT DOCUMENTS

| | | | | |
|---|---|---|---|---|
| 4,062,366 | A | * | 12/1977 | De Coene .............. A01D 41/12 460/14 |
| 4,305,407 | A | * | 12/1981 | De Coene ............ A01F 12/442 460/107 |
| 4,307,732 | A | * | 12/1981 | De Busscher ........ A01F 12/444 209/318 |
| 4,310,004 | A | * | 1/1982 | De Busscher .......... A01F 12/52 460/14 |
| 4,310,005 | A | * | 1/1982 | De Busscher ........ A01F 12/442 460/73 |
| 4,312,366 | A | * | 1/1982 | De Busscher .......... A01F 12/44 460/76 |
| 4,314,571 | A | * | 2/1982 | DeBusscher .......... A01F 12/442 460/99 |
| 4,332,262 | A | * | 6/1982 | De Busscher ........ A01F 12/442 460/75 |
| 4,378,024 | A | * | 3/1983 | De Busscher ........ A01F 12/442 460/73 |
| 4,458,697 | A | | 7/1984 | James |
| 4,489,734 | A | * | 12/1984 | Van Overschelde . A01F 12/442 460/112 |
| 4,821,744 | A | | 4/1989 | Turner et al. |
| 4,846,198 | A | * | 7/1989 | Carnewal ............... A01D 67/00 460/100 |
| 5,376,046 | A | | 12/1994 | Shuknecht et al. |
| 5,421,777 | A | * | 6/1995 | Strubbe .................. A01F 12/18 460/13 |
| 5,519,987 | A | | 5/1996 | Voss et al. |
| 5,830,061 | A | | 11/1998 | Voss et al. |
| 6,558,252 | B2 | | 5/2003 | Visagie et al. |
| 7,140,961 | B2 | | 11/2006 | Visagie et al. |
| 2005/0036868 | A1 | * | 2/2005 | Matousek ................. B60P 1/42 414/523 |
| 2006/0009269 | A1 | * | 1/2006 | Hoskinson ......... A01D 41/1271 460/2 |
| 2013/0165191 | A1 | * | 6/2013 | Farley ................. A01D 75/282 460/1 |

FOREIGN PATENT DOCUMENTS

| | | | |
|---|---|---|---|
| DE | 3540493 C1 | 4/1987 | |
| EP | 0516891 A1 | 12/1992 | |
| EP | 1820389 A1 | 8/2007 | |
| FR | 2058646 | 5/1971 | |
| GB | 1207804 | 10/1970 | |
| GB | 1240153 A | 7/1971 | |
| GB | 2024595 | 1/1980 | |
| JP | WO 2010095473 A1 * | 8/2010 | ............. A01F 12/52 |

* cited by examiner

COMBINE HARVESTER WITH TOP-LOCATED CLEANING ARRANGEMENT

CROSS REFERENCE TO RELATED APPLICATIONS

This Patent Application claims priority under 35 U.S.C. §119 to BE 2013/0626 filed on Sep. 19, 2013 titled, "Combine Harvester with Top-located Cleaning Arrangement" and having Bart M. A. Missotten and Frank R. G. Duquesne as the inventors. The full disclosure of BE 2013/0626 is hereby fully incorporated herein by reference.

FIELD OF THE INVENTION

The present invention is related to combine harvesters for gathering and processing crop material from a field, in particular to a new design of a combine harvester that is aimed at increasing the grain throughput in comparison to existing harvesters.

STATE OF THE ART

Combine harvesters are equipped with threshing/separation means arranged for threshing crops and separating a mixture of grains and residue from the crops, and with a cleaning arrangement for further separating the grains from the residue. In many present day harvesters, the threshing and separation is done by a pair of longitudinally arranged threshing and separation rotors. The cleaning arrangement comprises preparation means, for example a reciprocating grain pan or an auger bed, and a set of sieves. The preparation means are configured to deliver the grain/residue mixture to the sieves. Grains fall through the sieves, while residue is blown towards the rear of the machine by a blower or collected at the end of the sieves where it is evacuated from the harvester by a shredding and spreader arrangement. The cleaning arrangement is usually mounted underneath the threshing rotors, i.e. between the front wheels or tracks of the harvester.

This location of the cleaning arrangement represents a constraint in the development of cleaning systems with increased capacity in terms of the grain throughput. Important gains in capacity are expected to be obtainable for wider cleaning arrangements. However, dislocation of the cleaning to a position where its width can be increased poses new challenges in terms of the transportation of the grain/residue mixture towards the cleaning arrangement and adequate distribution of the mixture over the increased width.

SUMMARY OF THE INVENTION

The invention is related to a combine harvester aimed at overcoming the problems described above. Such a combine harvester is disclosed in the appended claims.

In a harvester according to the invention, the cleaning arrangement is placed above the threshing and separation means. Because more space is available there, the preparation means and the sieves of the cleaning arrangement can be made wider than the distance between the front wheels or tracks of the harvester. Supply means such as one or more auger beds are provided underneath the threshing and separation means, for gathering the grain/residue mixture in a single location. From that location, an elevator transports the grain/residue mixture up towards the cleaning arrangement, where it is distributed over the width of said cleaning arrangement. Specific distribution means may be provided for this purpose, such as one or more distribution augers, and/or the elevator may comprise multiple elevators, preferably loop elevators, configured to deposit the mixture at various locations along the width of the cleaning arrangement.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims.

Figure 1A:
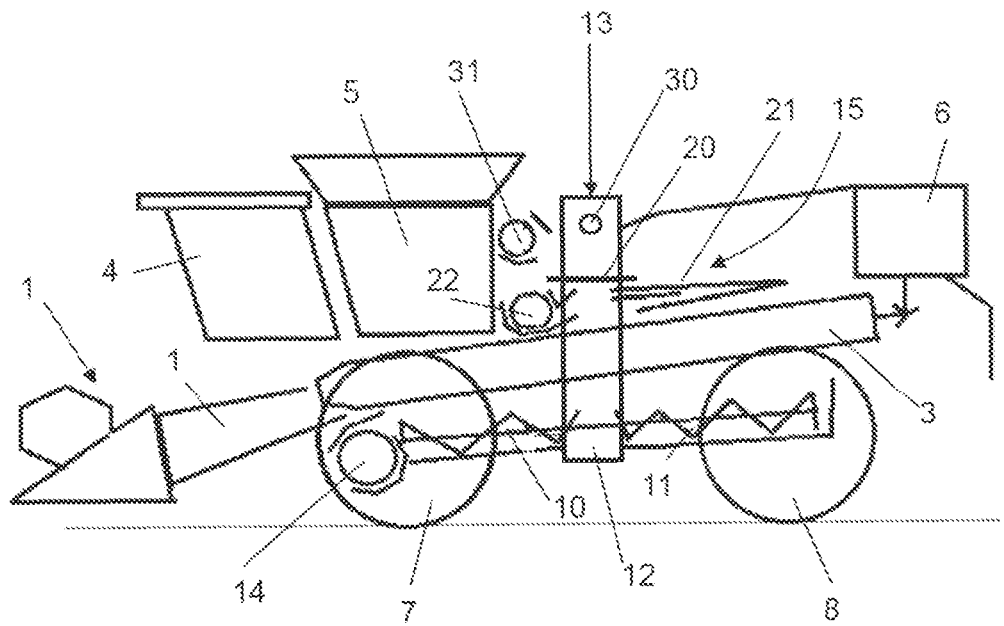
FIGS. 1a and 1b show side and front views of a combine harvester according to an embodiment of the invention equipped with a single loop elevator.
Figure 1B:
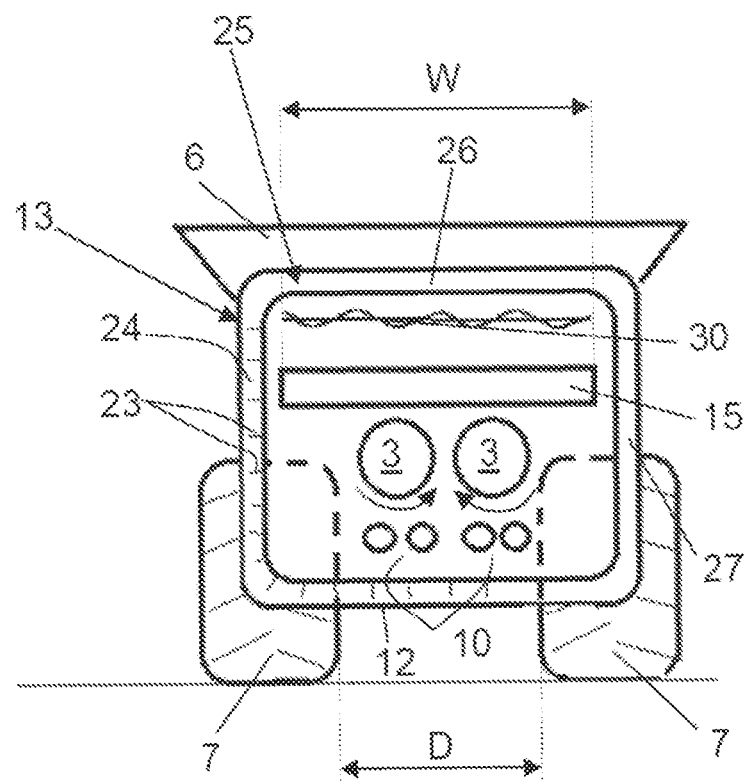

FIGS. 1a and 1b show a side and front view of a combine harvester according to an embodiment of the invention. Crops are cut from the field by the header assembly 1, and supplied by the feeder 2 to a set of threshing and separation rotors 3 (hereafter referred to as 'threshing rotors' for reasons of conciseness), arranged along the longitudinal direction of the harvester. The driver's cabin 4 is indicated, as well as a grain tank 5 and the engine 6, configured to drive the harvester's propulsion and the rotation of the rotors 3 as well as other moving components. The harvester is supported on two pairs of front and back wheels 7 and 8 respectively.

Longitudinally arranged threshing rotors 3 are known as such in the art. They are basically cylinders provided with threshing elements, and rotating in opposite directions (indicated by the arrows in FIG. 1b), so as to transport the crops in the form of a helically wound sheet around each of the cylinders, from the front of the rotors to the back. Larger crop material such as stalks and leaves stay within the wound sheet and are evacuated through a shredding and spreader arrangement at the back (not shown), while smaller residue and grains are separated from the stalks and fall down from the rotors. This mixture of residue and grain is received by a first and second auger bed 10 and 11, arranged underneath a front and a back portion of the rotors respectively. Each of the auger beds 10/11 is configured to transport a grain/residue mixture towards the collection area 12 of a loop elevator 13. A blower 14 may be mounted at the front of the threshing rotors 3, said blower being configured to blow light residue from the mixture that is falling from the threshing rotors, towards the back of the harvester, thereby establishing a first separation of the grain/residue mixture. The invention is however not limited to embodiments wherein such a front blower 14 is present.

The loop elevator 13 is a transport system known as such in the field of agricultural machines, and may be installed and operated in a manner known in this technical field. The elevator 13 is configured to transport the mixture received in the collection area 12 from both auger beds 10/11 upwards and to deliver the mixture to a cleaning arrangement 15 mounted above the threshing rotors 3. The cleaning arrangement comprises a reciprocating preparation pan 20 and a reciprocating sieve 21 (or preferably several sieves) as known per se in the art, with a main blower 22, arranged to blow light residue material towards the back of the harvester as it falls from the preparation pan 20 onto the sieve 21 (and from one sieve to a subsequent sieve if several sieves are installed). A transportation means known as such in the art and not shown in the drawing is provided for transporting the clean grain towards the grain tank 5, from which it can be removed via a grain spout to an external container. As seen in FIG. 1b, the width W of the cleaning arrangement (being the width of the preparation pan 20 and of the sieve(s) 21 or the width of the wider of the two) is larger than the distance D between the front wheels 7.

The mixture is collected in the collection area 12 of the loop elevator 13 by the paddles 23 of the elevator, transported upwards via the left hand side elevator path 24, to the delivery area 25, where it falls down from the paddles and onto the preparation pan 20. The emptied paddles 23 continue along the top horizontal elevator path 26 and the right hand side vertical path 27, back to the collection area 12, where they collect a fresh batch of grain/residue mixture. As seen in the drawings, the loop elevator 13 is wrapped around the totality of the cleaning arrangement (total width W) and the threshing and separation rotors 3.

As stated earlier, the harvester of the invention is configured to distribute the mixture transported to the top-located cleaning arrangement 15, over the width of the preparation pan 20. In the embodiment of FIG. 1a/1b, this is achieved by a distribution auger 30 mounted underneath the top horizontal path 26 of the loop elevator 13, and oriented horizontally and essentially perpendicularly to the harvester's longitudinal direction. The mixture enters the distribution auger 30 at the delivery area 25 and is transported along the full width of the preparation pan 20, while material progressively falls down from the distribution auger 30. Without the distribution auger 30, all of the mixture material would fall onto one half of the preparation pan's width, without being evenly distributed over the full width W. The distribution auger can be brought into practice and operated according to designs known as such in the art but not used in combination with an elevator and cleaning arrangement mounted above the threshing rotors. The distribution auger 30 can be a standard grain auger mounted in a housing with openings or a grating on the underside of the housing so that the mixture falls through said openings or grating onto the preparation pan as it is transported from one side of the pan where the mixture is deposited by the elevator, to the other side of the pan (or to the middle of the pan if more than one elevator is used, see further). A more effective example of a suitable design of the distribution auger 30 is shown in document U.S. Pat. No. 4,458,697, included herein by reference. According to a preferred embodiment and as equally disclosed in U.S. Pat. No. 4,458,697, a pair of accelerator rolls is mounted underneath the distribution auger 30.

In the embodiment of FIG. 1, an additional blower 31 (in addition to the standard blower 22) is mounted above the preparation pan 20. This additional blower is configured to blow light residue material from the mixture falling down from the distribution auger 30, said residue being blown towards the back of the harvester, thereby establishing an additional separation (in addition to the front-mounted blower 14) of the mixture before it reaches the cleaning arrangement. The mounting of this blower 31 is possible given that the fall height of the mixture onto the preparation pan 20 can be chosen higher because more space is available than when the cleaning arrangement is located underneath the threshing rotors 3. The additional blower 31 thus allows to increase the cleaning efficiency. The invention is however not limited to the embodiment where this additional blower 31 is present.

Figure 2A:
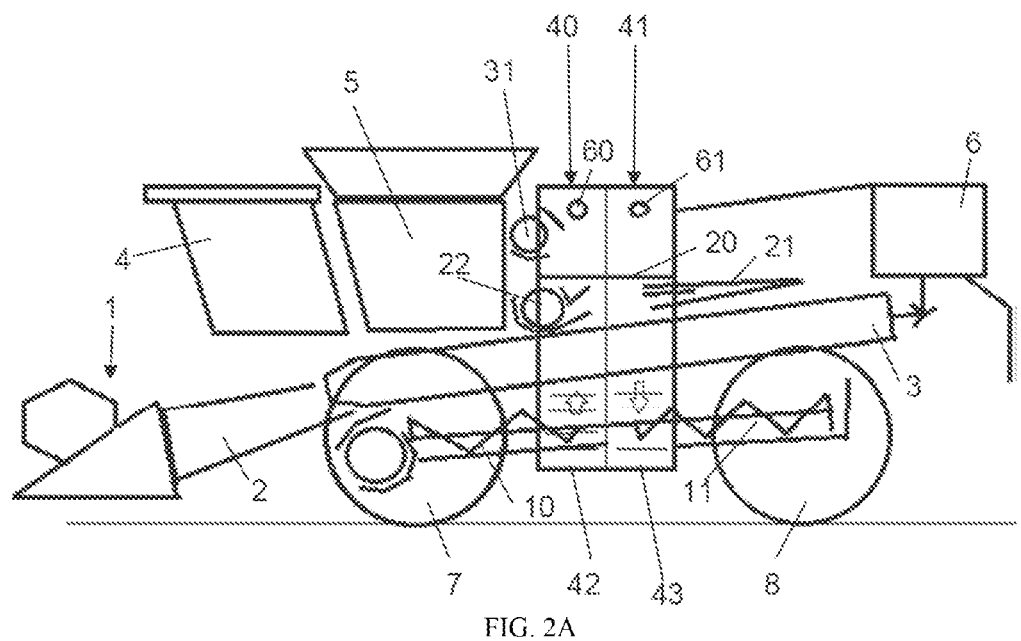
FIGS. 2a and 2b show side and front views of a combine harvester according to another embodiment, equipped with a double loop elevator.
Figure 2B:
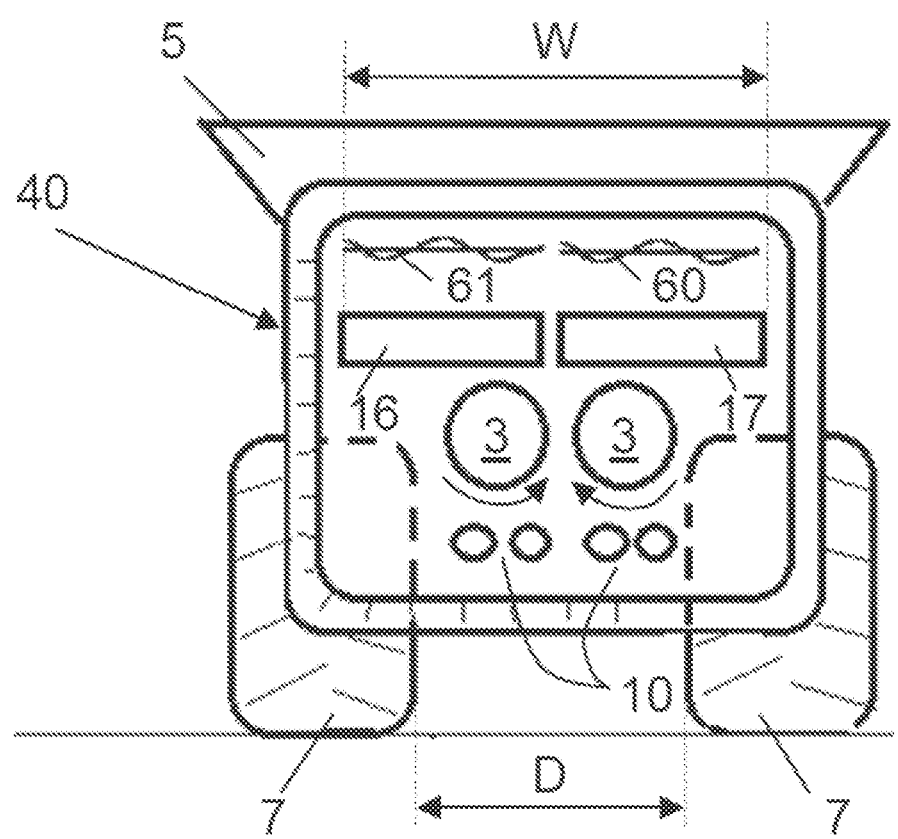

Advantageously, and as illustrated in FIG. 2b, the cleaning arrangement may consist of two partial-width cleaning arrangements 16 and 17, mounted side by side to thereby span the full width W (preferably with each cleaning arrangement having approximately a width of W/2). This means two sets of a preparation pan 20 and a sieve or sieves 21. For example a total width W of about 2 m may be covered by two cleaning arrangements of about 1 m wide each. Useful in particular in combination with this split cleaning arrangement, one embodiment of the invention provides another way of distributing the grain/residue mixture over the full width W of the cleaning arrangement 16/17. This embodiment is illustrated in FIG. 2a. Instead of one loop elevator, two loop elevators 40 and 41 are mounted side by side in the longitudinal direction of the harvester. The elevators 40/41 are configured to transport the grain/residue mixture upwards by sets of paddles moving in horizontal and vertical paths as described above, wherein the paddles of the two elevators are configured to move in mutually opposite directions.

Figure 3A:
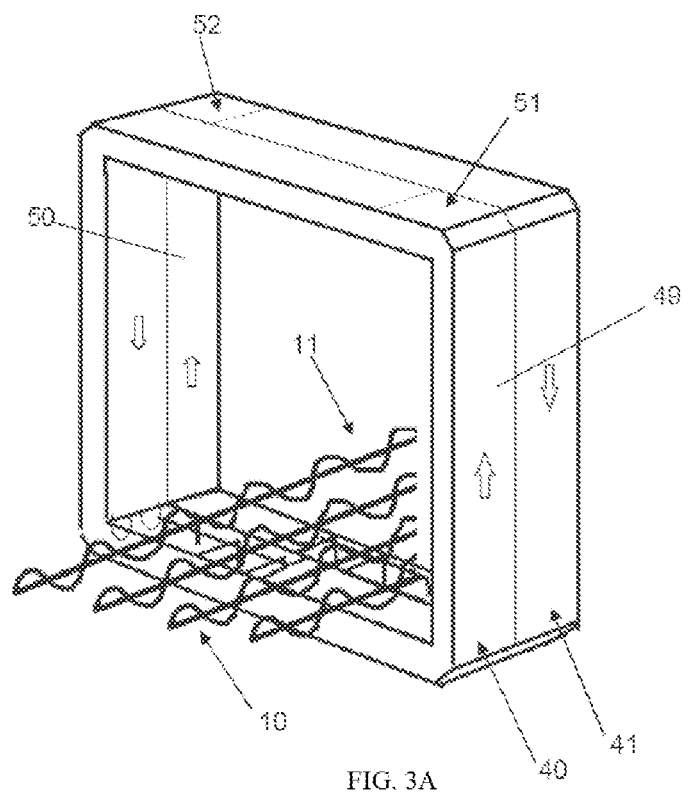
FIG. 3a shows a 3D-view of the double loop elevator used in the embodiment of FIG. 2.
Figure 3B:
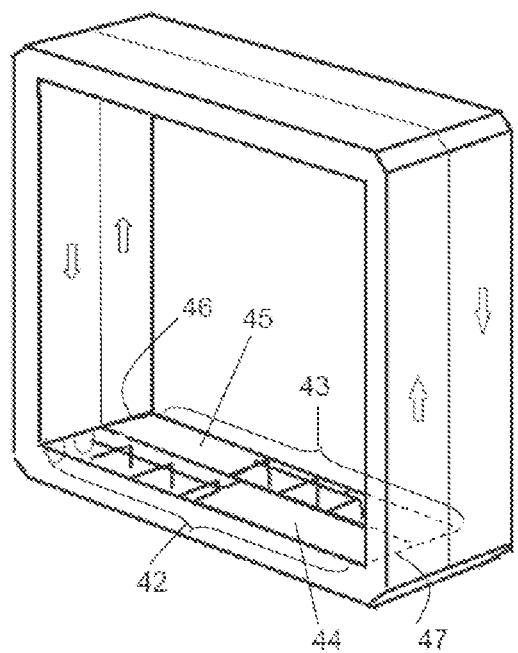
FIG. 3b shows a 3D-view of the double loop elevator of FIG. 3a with the augers removed.

A 3-D view of the two loop elevators 40/41 is shown in FIGS. 3a and 3b. As in the previous embodiment, auger beds 10/11 transport the grain/residue mixture collected from the threshing rotors 3 towards the respective collection areas of the loop elevators. FIG. 3b shows the same pair of elevators, with the augers 10/11 removed from the drawing, for the sake of clarity. As seen in the latter drawing, the receiving areas 42 and 43 are partially covered by plates 44 and 45 respectively, so as to partially obstruct access to the receiving areas. The plates are placed against opposite side edges 46 and 47 of the receiving areas, and placed in checkerboard fashion, as shown in the drawing, or with a slight overlap between the two plates. In other words, each plate 44/45 covers a first portion of its respective receiving area 42/43 and leaves a second portion uncovered, wherein the uncovered portions do not overlap (i.e. there is no part of the receiving areas 42/43 that is not covered by either of the plates). In this way, each of the loop elevators 40/41 receives a grain/residue mixture from both a front and a back portion of the threshing rotors 3. The first loop elevator 40 transports the received mixture upwards via the right hand side vertical path 49 of said first elevator 40, while the second loop elevator 41 transports the received mixture upwards via the left hand side vertical path 50 of said second elevator 41. Both elevators thus supply the mixture to respective delivery areas 51 and 52 (approximately delineated by dotted lines) located on opposite sides of the full width W of the cleaning arrangement 16/17. As the mixture is thereby simultaneously supplied on both sides of the preparation pan 20, accumulation of the mixture on one side is avoided and equal distribution of the mixture over the full width W is facilitated.

According to a preferred embodiment illustrated in FIGS. 2a/2b, the double loop elevator described above is combined with a set of two distribution augers 60 and 61, placed underneath the top horizontal path of the two elevators 40/41 respectively, each distribution auger covering a portion of the full width of the cleaning arrangement (preferably W/2). These distribution augers can be brought into practice in the same way as the single distribution auger 30 described previously, and may also be combined with sets of accelerator rolls mounted underneath the distribution augers.

The double elevator embodiment described above may be combined with a single cleaning arrangement 15 as shown in FIG. 1. More than two loop elevators 40/41 could be provided side by side in the longitudinal direction of the harvester, to thereby deposit the mixture at multiple locations along the width of the preparation pan, for example on the two side edges and in the middle. In any of the embodiments described above, another elevator system may be applied instead of a loop elevator, for example an elevator used as clean grain elevator in existing harvesters, with the up and down going paths of the carrier paddles located on the same side of the harvester. In this embodiment, the standard elevator can be located at the same location along the length of the harvester as is shown in the case of the loop elevator in FIG. 1a. Instead of the loop elevator's receiving area 12, this embodiment of the harvester has a laterally conducting auger or auger bed, for bringing the grain/residue mixture to the side of the harvester where the elevator is located, and where the mixture is picked up by this elevator and transported upwards towards the cleaning arrangement. The mixture may then be dropped along the width of the cleaning pan by a conventional auger in a housing with openings or a grating as described above, or more preferably by a distribution auger as described in U.S. Pat. No. 4,458,697. Possibly an additional transportation auger or auger bed is needed at the top of the elevator, to bring the mixture from the elevator to the preparation pan (e.g. to the side or the middle of the pan's width). Said additional auger may then further be used as a distribution auger in the manner described above (housing with openings or grating), or it may be combined with a distribution auger of the type described in U.S. Pat. No. 4,458,697. Another option is that two standard grain elevators are used, configured to supply the mixture to opposite sides of the cleaning arrangement, in analogy with the above-described loop elevators 40 and 41, and preferably further equipped with transportion and/or distribution augers according to any of the embodiments described above.

Instead of wheels 7/8, tracks may be provided at the front and/or back of the harvester.

According to an embodiment, the loop elevator(s) may be located to one side of the threshing rotors, instead of being centrally located between a first and second portion of said rotors. One single auger bed is then required for transporting the mixture towards the receiving area of said loop elevator(s), instead of two auger beds 10/11.

The invention claimed is:

1. A combine harvester comprising
a threshing and separation system comprising a longitudinally extending rotor;
a cleaning arrangement comprising one or more sieves and at least one conveying device configured for delivering at least one of grain and residue to the one or more sieves, wherein the cleaning arrangement is located directly above a portion of the rotor of the threshing and separation system,
an elevator and distributor system comprising a collection area underneath the threshing and separation system and a delivery area above said threshing and separation system, and having a first conveyer laterally offset from the rotor and configured to transport a mixture of grains and crop residue material upwards from said collection area to said delivery area, and a second conveyor configured to distribute the mixture along the width of the cleaning arrangement,
a supply configured to receive said mixture from said threshing and separation system and to supply the mixture to said collection area
a vehicle body, wherein a feeder is connected to a front portion of the vehicle body;
a pair of ground engaging traction elements mounted to the vehicle body on opposing sides of the feeder at the front and back of the vehicle body;
wherein a first width of the cleaning arrangement is greater than a second width between the front ground engaging traction elements and cleaning arrangement is mounted to the vehicle body at a location higher than the ground engaging traction elements such that the cleaning arrangement can extend beyond the second width between the traction elements.

2. Combine harvester according to claim 1, wherein
said first conveyor comprises at least one grain elevator, configured to transport said mixture from the collection area to the delivery area, and
said second conveyor comprises at least one distribution auger configured to receive said mixture at the delivery area and to distribute said mixture over at least a portion of the complete width of the at least one conveying device.

3. Combine harvester according to claim 2, wherein said elevator is a single loop elevator, wrapped around the threshing and separation system, the supply and the cleaning arrangement.

4. Combine harvester according to claim 1, wherein said supply comprises at least one auger bed located underneath the threshing and separation system.

5. Combine harvester according to claim 1, wherein the threshing and separation system comprises a pair of longitudinally placed threshing and separation rotors.

6. Combine harvester according to claim 1, comprising a blower configured to blow light residue material from the mixture of grain and residue as said mixture falls from the threshing and separation system onto the supply, said light residue material being blown towards the back of the harvester.

7. Combine harvester according to claim 1, comprising a blower configured to blow light residue material from the mixture of grain and residue as said mixture falls from the delivery area of said elevator and distributor onto the at least one conveying device of the cleaning arrangement, said light residue material being blown towards the back of the harvester.

8. Combine harvester according to claim 1, wherein said at least one conveying device is a reciprocating grain pan.

9. Combine harvester according to claim 1, wherein said first and second conveyors are first and second loop elevators, wherein the first and second loop elevators are wrapped around the threshing and separation system, the supply and the cleaning arrangement, and wherein the first and second loop elevators are configured to transport the mixture in opposite directions from the collection area of said elevators to the delivery area.

10. A combine harvester provided with a threshing and separation system and a cleaning arrangement, the cleaning arrangement comprising one or more sieves and at least one conveying device configured for delivering at least one of grain and residue to the one or more sieves, wherein the cleaning arrangement is located above the threshing and separation system,
an elevator and distributor system comprising a collection area underneath the threshing and separation system and a delivery area above said threshing and separation system, and configured to transport a mixture of grains and crop residue material upwards from said collection area to said delivery area, and to distribute the mixture along the width of the cleaning arrangement, a supply configured to receive said mixture from said threshing and separation system and to supply the mixture to said collection area;

wherein said elevator and distributor system comprises multiple grain elevators arranged at different positions along the longitudinal direction of the harvester, and configured to deposit said mixture of grain and residue at a plurality of locations along the width of said at least one conveying device.

11. Combine harvester according to claim 10, wherein said multiple grain elevators comprise a first and second elevator, wherein the first elevator delivers the mixture to its delivery area located to one side of the width of the at least one conveying device and the second elevator delivers the mixture to its delivery area located on the opposite side of the width of the at least one conveying device.

12. Combine harvester according to claim 11, wherein said first and second elevator are loop elevators, wrapped around the threshing and separation system, the supply and the cleaning arrangement, and are configured to transport the mixture in mutually opposite directions from the respective collection areas of said elevators to the respective delivery areas of said elevators.

13. Combine harvester according to claim 11, wherein said elevator and distributor system is located between a first and second portion of the threshing and separation system, and wherein the supply comprises first and second portions configured to receive said mixture respectively from said first and second portions of the threshing and separation system, and to deliver said mixture to the collection areas of said first and second elevators, and wherein each of said first and second elevator is configured to receive said mixture from both the first and second portion of the supply.

14. Combine harvester according to claim 13, wherein said first and second elevators are loop elevators, and wherein the collection areas of said respective loop elevators are provided with cover plates arranged on opposite sides of said collection areas, each plate covering a first portion of its respective receiving area and leaving a second portion uncovered, wherein the uncovered portions do not overlap, so as to ensure that both elevators receive a mixture from both the first and second portion of the supply.

15. Combine harvester according to claim 1, wherein said cleaning arrangement consists of a first and second portion each portion spanning a part of the complete width of the cleaning arrangement, each portion comprising a respective conveying device of the at least one conveying device and one or more sieves.

16. A combine harvester comprising
a threshing and separation system;
a cleaning arrangement comprising one or more sieves and at least one conveying device configured for delivering at least one of grain and residue to the one or more sieves, wherein the cleaning arrangement is located above the threshing and separation system,
an elevator and distributor system comprising a collection area underneath the threshing and separation system and a delivery area above said threshing and separation system, and configured to transport a mixture of grains and crop residue material upwards from said collection area to said delivery area, and to distribute the mixture along the width of the cleaning arrangement,
a supply configured to receive said mixture from said threshing and separation system and to supply the mixture to said collection area;
wherein said cleaning arrangement consists of a first and second portion, each portion spanning a part of the complete width of the cleaning arrangement, each portion comprising a respective conveying device of the at least one conveying device and one or more sieves;
wherein said elevator and distributor system comprises a first and second elevator, configured to transport mixture from the collection area to the delivery area, wherein the first elevator delivers the mixture to its delivery area located to one side of the width of the conveying device of the first portion of the cleaning arrangement and the second elevator delivers the mixture to its delivery area located to one side of the width of the conveying device of the second portion of the cleaning arrangement, and wherein a distribution auger is provided above each of the conveying devices of both portions of the cleaning arrangement, said distribution augers configured to receive said mixture at the respective delivery area of said elevators and to distribute said mixture over at least a portion of the complete width of the conveying device of the first and second portion of the cleaning arrangement respectively.

* * * * *